(12) United States Patent
Meier et al.

(10) Patent No.: US 7,604,532 B2
(45) Date of Patent: Oct. 20, 2009

(54) WHIP AS PART OF A SLAUGHTER LINE

(75) Inventors: Ernst-August Meier, Salzdetfurth (DE); Peter Nagorny, Seevetal (DE)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 12/318,110

(22) Filed: Dec. 22, 2008

(65) Prior Publication Data
US 2009/0149121 A1    Jun. 11, 2009

Related U.S. Application Data

(63) Continuation of application No. PCT/EP2007/054606, filed on May 14, 2007.

(30) Foreign Application Priority Data
Jun. 21, 2006    (DE)    ........................ 10 2006 028 477

(51) Int. Cl.
*A22B 5/08* (2006.01)
(52) U.S. Cl. ........................................................ 452/93
(58) Field of Classification Search ................... 452/93, 452/97
See application file for complete search history.

(56) References Cited

U.S. PATENT DOCUMENTS

| 994,523 | A | 6/1911 | Kohlhepp |
| 1,502,749 | A | 7/1924 | Schmidt |
| 2,559,001 | A | 7/1951 | Barker |
| 2,604,656 | A | 7/1952 | Anderson et al |
| 3,108,317 | A | 10/1963 | Tomlinson |
| 3,124,832 | A * | 3/1964 | Kravertz et al. ............... 452/93 |
| 3,795,942 | A * | 3/1974 | Crane ........................... 452/93 |
| 3,840,938 | A * | 10/1974 | Carlson ........................ 452/93 |
| 4,570,297 | A * | 2/1986 | Nijhuis ......................... 452/97 |
| 5,569,066 | A | 10/1996 | Meier et al. |
| 7,080,828 | B2 | 7/2006 | Meier et al. |

FOREIGN PATENT DOCUMENTS

WO    WO 92/09205    6/1992

* cited by examiner

*Primary Examiner*—Thomas Price
(74) *Attorney, Agent, or Firm*—Walter Ottesen

(57) ABSTRACT

A whip, particularly a double whip (1), as part of a slaughter line includes at least a whip section (A) and a head section (B) which is in contact with a machine shaft. The whip section (A) is made of a soft polymeric material while the head section (B) is made of a hard and impact-resistant polymeric material as a hard-soft combination with the whip section and the head section being integrally joined to one another within a connecting region (C) thereof. The whip section (A) is provided with a rib-groove system (2) within the impact zone or effective zone. The connecting region (C) between the whip section (A) and the head section (B) is designed such that a large adhesion area (3) is provided, especially by forming a wedge. The head section (B) is additionally provided with a recess (4) that has a substantially tubular configuration for accommodating a bushing (5).

27 Claims, 1 Drawing Sheet

WHIP AS PART OF A SLAUGHTER LINE

CROSS REFERENCE TO RELATED APPLICATIONS

This application is a continuation application of international patent application PCT/EP 2007/054606, filed May 14, 2007, designating the United States and claiming priority from German application 10 2006 028 477.1, filed Jun. 21, 2006, and the entire content of both applications is incorporated herein by reference.

FIELD OF THE INVENTION

The invention relates to a whip, especially a double whip, as part of a slaughter line, including at least a whip section and a head section which is in contact with a machine shaft.

BACKGROUND OF THE INVENTION

Double whips, as well as hair removal beaters, are parts of a slaughter line, where, in addition to metal structural parts, polymeric materials are also used. In this regard, reference is made, for example, to U.S. Pat. Nos. 1,502,749; 2,604,656; and 5,569,066.

In slaughterhouses, double whips are threaded in the machine onto a shaft. If a whip should malfunction, the whole of the whip strand had hitherto to be disassembled and reassembled again.

SUMMARY OF THE INVENTION

In view of the foregoing, it is the object of the invention to provide a whip, in particular a double whip, which can be assembled from outside.

This object is achieved in that, within the framework of a hard-soft combination, the whip section comprises a soft polymeric material and the head section comprises a hard and impact-resistant polymeric material with the whip section and head section being integrally joined within their connecting region.

The head section, as a receiving and connecting head (with respect to the machine shaft), is formed from hard plastic. This allows the whip head to be shaped such that easy assembly and disassembly are ensured.

The whip section can be comprised of elastomeric material based on vulcanized rubber mixtures. The following rubber components, in particular, are noted:
  ethylene-propylene-diene copolymer (EPDM)
  nitrile rubber (NBR)
  silicone rubber
  butyl rubber (IIR)
  chlorobutyl rubber (CIIR)
  bromobutyl rubber (BIIR).

Blends, especially an EPDM/NBR blend, can also be used. It is particularly expedient if the whip section consists of a thermoplastic elastomer (TPE), the relevant material technology being examined in somewhat greater detail below.

Styrene-based thermoplastic elastomers (TPE-S), uncured or partially cured olefin-based thermoplastic polymers (TPE-O), or fully cured olefin-based thermoplastic elastomers (TPE-V) can be used. In addition, thermoplastic elastomers based on a blend of a thermoplastic polymer and an at least partially cured rubber, especially based on EPDM, are usable.

With respect to the hard head section, the following materials, in particular, are used:
  polyethylene (PE), especially a high-density polyethylene (HD-PE);
  polypropylene (PP);
  polyphenylene ether (PPE; brandname "Vestoran" from the Hüls Company).

The whip section and/or the head section can further be provided with an embedded reinforcement.

In the case of the whip section, the reinforcement comprises a single-layered or multilayered fabric. Alternatively, fibers can be used as reinforcing means with polyester, polyamide, aramid or cotton, in particular, being mentioned. In the case of the head section, the fiber reinforcement is preferred especially glass fiber reinforcement.

The fibers are finely distributed within the polymeric material of the whip section and the head section.

The whip section and/or the head section, especially the whip section, can be equipped, moreover, so as to be microbe-resistant. This means that an active inhibitor is blended with the polymeric material, with this active inhibitor preventing the proliferation of microorganisms (bacteria, microbes). The inhibitor is preferably poorly soluble in water and is thereby prevented from being washed out.

Particularly effective inhibitors, including in terms of the abovementioned poor solubility, are:
  2,4,4'-trichloro-2'-hydroxydiphenylether;
  N'-tert-butyl-N-cyclopropyl-6-(methylthio)-1,2,5-triazine-2,4-diamine.

In this regard, reference is made to clarification basin membrane technology disclosed in U.S. Pat. No. 7,080,828.

The whip section and the head section are integrally joined by means of a chemically acting adhesive.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
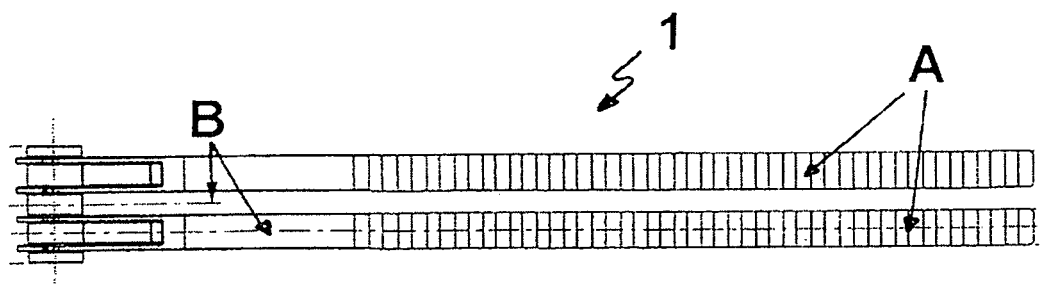
FIG. 1 shows a double whip including a whip section and a head section.

According to FIG. 1, the double whip 1 includes a whip section A made of a soft polymeric material (for example, TPE) and a head section B made of a hard and impact-resistant polymeric material (for example, PP).

Figure 2:
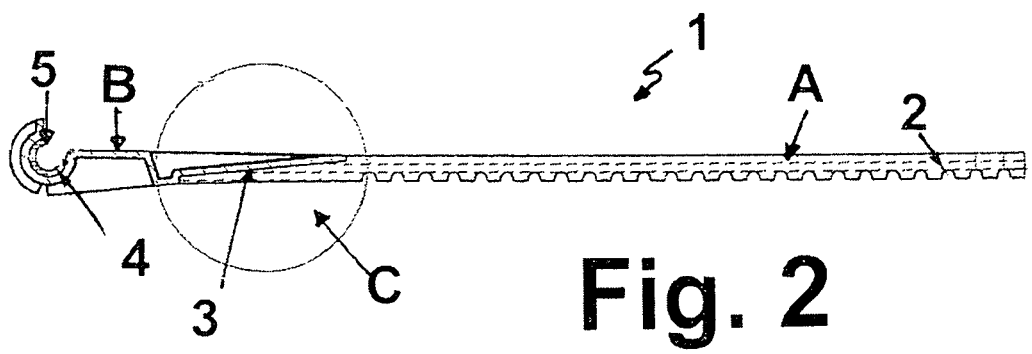
FIG. 2 shows the longitudinal section of a whip according to FIG. 1.

According to FIG. 2, the whip section A of the double whip 1 is provided within its impact and working zone with a rib-groove system 2. The head section B, which is free of such a rib-groove system, is in contact with the machine shaft. Within the connecting region to the machine shaft, the head section is provided with a recess 4 of substantially tubular design for accommodating a bushing 5. The head section B, the bushing 5 and the machine shaft form a structural entity. The connecting region C including the adhesive contact surface 3 of the whip and head sections is now described in greater detail in connection with FIG. 3.

Figure 3:
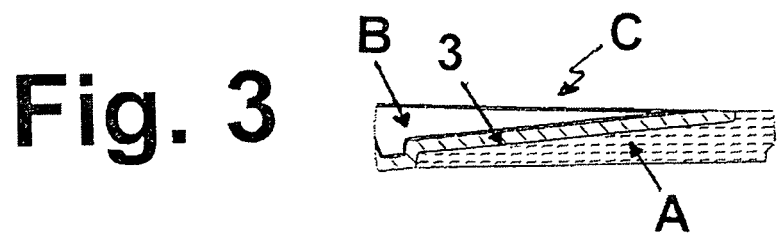
FIG. 3 shows the connecting region of the whip section and the head section; and, FIGS. 4 and 5 show details of the head section in connection with the accommodation of a bushing.

FIG. 3 shows the connecting region C of the whip section A and head section B. The connecting region is here formed by the creation of a wedge such that a large adhesive contact surface 3 is formed. In this way, the whip and head sections, in association with a chemical adhesive, enter into a permanent connection. An additional mechanical connection is not necessary.

Figure 4:
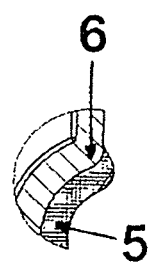
Figure 5:
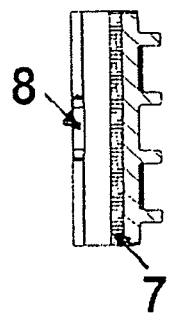

According to FIG. 4, the head section B is equipped with an anti-twist protection 6 for the bushing 5. The geometry is here realized such that the bushing, when pressed in, falls automatically into the correct position and cannot twist during operation. FIG. 5 shows an additional protection 7 to prevent the bushing from falling out with the bushing being provided on both sides with a collar. In addition, the bushing has a cutout 8 to enable a tool to be applied for the disassembly thereof.

It is understood that the foregoing description is that of the preferred embodiments of the invention and that various changes and modifications may be made thereto without departing from the spirit and scope of the invention as defined in the appended claims.

Reference Symbol List 1 double whip
2 rib-groove system
3 adhesive contact surface
4 recess
5 bushing
6 anti-twist protection
7 additional protection
8 cutout
A whip section
B head section
C connecting region of the whip and head sections

What is claimed is:

1. A whip as part of a slaughter line, the whip comprising:
    a whip section (A) made of a soft polymeric material;
    a head section (B) made of a hard and impact-resistant polymeric material; and,
    said whip section (A) and said hard section (B) being juxtaposed to define a hard-soft combination; and,
    said whip section (A) and said head section (B) conjointly defining a connecting region (C) whereat said whip section (A) is joined to said head section (B).

2. The whip of claim 1, wherein the whip section (A) is comprised of an elastomeric material.

3. The whip of claim 1, wherein the whip section (A) is comprised of a thermoplastic elastomer (TPE).

4. The whip of claim 1, wherein the whip section (A) is provided with an embedded reinforcement.

5. The whip of claim 4, wherein said embedded reinforcement is comprised of a single-layered or multilayered fabric.

6. The whip of claim 4, wherein said embedded reinforcement is comprised of fibers.

7. The whip of claim 6, wherein said fibers are finely distributed within said polymeric material.

8. The whip of claim 6, wherein said fibers comprised of polyester, polyamide, aramid or cotton.

9. The whip of claim 1, wherein said whip section (A) has an impact and working zone and said impact and working zone having a rib-groove system formed therein.

10. The whip of claim 1, wherein said head section (B) is comprised of polyethylene (PE).

11. The whip of claim 10, wherein said head section (B) is comprised of a high-density polyethylene (HD-PE).

12. The whip of claim 1, wherein said head section (B) is comprised of polypropylene (PP).

13. The whip of claim 1, wherein said head section (B) is comprised of polyphenylene ether (PPE).

14. The whip of claim 1, wherein said head section (B) is provided with an embedded reinforcement.

15. The whip of claim 14, wherein said embedded reinforcement is comprised of fibers.

16. The whip of claim 15, wherein said embedded fibers are finely distributed within said hard and impact-resistant polymeric material.

17. The whip of claim 15, wherein a glass fiber reinforcement is present in said head region (B).

18. The whip of claim 1, wherein at least one of said whip section (A) and said head section (B) is equipped with an active inhibitor so as to be microbe-resistant.

19. The whip of claim 1, wherein said whip section (A) and said head section (B) are joined within said connecting region (C) by a chemically acting adhesive.

20. The whip of claim 1, wherein said whip section (A) and said head section (B) conjointly define an interface at said connecting region (C) shaped such that a large adhesion contact interface is formed.

21. The whip of claim 20, wherein the large adhesion contact interface is formed as a wedge between said whip section (A) and said head section (B).

22. The whip of claim 1, wherein said head section (B) is provided with a recess of substantially tubular configuration accommodating a bushing therein.

23. The whip of claim 22, wherein said head section (B) is shaped such that an anti-twist protection for said bushing is formed.

24. The whip of claim 22, wherein said bushing is provided on both sides with a collar for the purpose of additional protection to prevent said bushing from falling out of said recess.

25. The whip of claim 22, wherein said bushing has a cutout to enable a tool to be applied for the disassembly thereof.

26. The whip of claim 1, wherein said whip is a double whip.

27. A double whip assembly as part of a slaughter line, the double whip assembly comprising:
    a shaft;
    a first whip including: a whip section (A) made of a soft polymeric material; a head section (B) made of a hard and impact-resistant polymeric material and being connected to said shaft; said whip section (A) and said hard section (B) being juxtaposed to define a hard-soft combination; and, said whip section (A) and said head section (B) conjointly defining a connecting region (C) whereat said whip section (A) is joined to said head section (B);
    a second whip including: a whip section (A) made of a soft polymeric material; a head section (B) made of a hard and impact-resistant polymeric material and being connected to said shaft; said whip section (A) of said second whip and said hard section (B) of said second whip being juxtaposed to define a hard-soft combination; and, said whip section (A) of said second whip and said head section (B) of said second whip conjointly defining a connecting region (C) whereat said whip section (A) of said second whip is joined to said head section (B) of said second whip; and,
    said first and second whips being arranged side-by-side on said shaft to define said double whip assembly.

* * * * *